A. MOFFATT.
PRIMING CARTRIDGE.
No. 4,075. Reissued July 19, 1870.
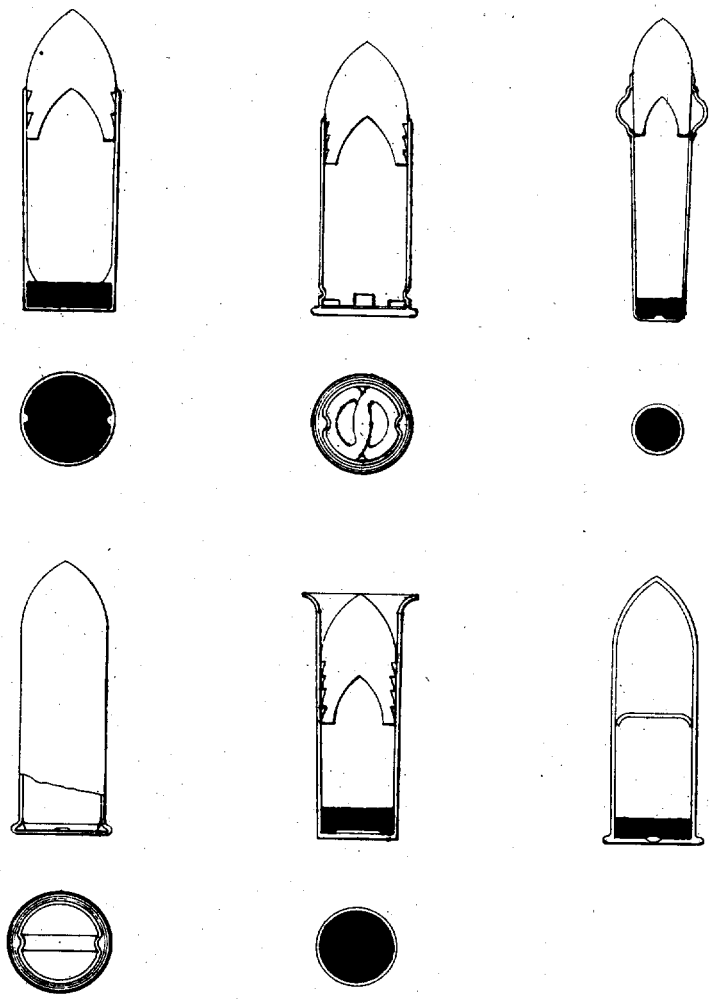
WITNESSES.
Wm. A. Martinan.
James E. Bedell
INVENTOR.
A. Moffatt.
By S. S. Fitch his attorney
THE NORRIS PETERS CO., PHOTO-LITHO., WASHINGTON, D. C.

United States Patent Office.

ARTHUR MOFFATT, OF WASHINGTON, DISTRICT OF COLUMBIA.

*Letters Patent No.* 53,168, *dated March* 13, 1866; *reissue No.* 4,075, *dated July* 19, 1870.

DIVISION 1.

IMPROVEMENT IN PRIMING CARTRIDGES

The Schedule referred to in these Letters Patent and making part of the same.

*To all whom it may concern:*

Be it known that I, ARTHUR MOFFATT, of the city of Washington, District of Columbia, have invented certain new and useful Improvements in Metallic Cartridges for Breech-loading Fire-Arms; and I do hereby declare that the following is a full, clear, and exact description of the same, reference being had to the accompanying drawing forming part of this specification, and to the letters of reference marked thereon, in which—

Figures 1, 2, 3, and 4 are longitudinal central sections of cartridge-cases with my improvement attached.

Figures 1′, 2′, 3′, and 4′ are front end views of the same, taken on the line *x x* of the several figures under which they are placed.

Figure 5 is a detached wad or anvil of compressed or hard powder.

Figure 6 is a front face view of a removable metallic anvil, as seen in fig. 2.

Figures 7, 8, 9, 10, 11, and 12 show the application of my improvement to cartridges of various forms.

Similar letters of reference indicate like parts in the several figures.

The nature of my invention consists in a combined rim and center-primed cartridge, with or without a flange, the fulminate applied in the center, and around its periphery.

It further consists in furnishing a cartridge-case with an anvil on which to explode the priming of compressed powder, or any composition that will be consumed when the cartridge is fired, said anvil to be used in combination with loose or grain powder or gun-cotton, and to be primed with a fulminating material applied around its periphery, or at its center, or both, adapted as a priming to cartridge-cases with or without a flange.

It also consists in a removable metallic anvil or disk, having a fulminate, or bearing for the fulminate, in its center and around its periphery, that can be removed by hand for the purpose of reloading the cartridge-shell.

It is well known that metallic cartridges are much more expensive than unfixed ammunition, and that the shells of the former are generally thrown away as useless after the cartridge has been fired, there being no known way to bring them into use again without sending them back to the manufactory where they are made.

All the metallic cartridges that have hollow-flanged heads, for the purpose of containing the fulminate, are defective in this respect, viz: that in the act of forming this hollow flange, the metal is so stretched that it becomes weak at that point, and, in firing, the heads of the cartridges are liable to be blown off, or to burst out in such a manner as to render it very difficult to open the breech of the gun.

It is also an object to have a cartridge-shell so constructed that it can be reloaded by hand after the cartridge has been fired, which will enable those who use them to insert any kind or quantity of powder, shot, or ball, in them that they may desire.

By the use of my removable metallic anvil, as shown in fig. 2, or the anvil of hard powder, as shown in fig. 1, any of the metallic cartridges now in use can be reloaded by hand, with great facility, after they have been fired.

To enable others skilled in the art to construct and use my invention, I will proceed to describe its construction and operation.

In the drawing—

Figs. 2, 2′, 8, and 8′, *a* represents an ordinary metallic cartridge-shell, with my improvement attached at one end, and a ball at the other end.

*b* is an anvil or disk, (for a top view, see fig. 6.) Said disk or anvil is made of iron or other metal, and has its upper face divided into two inclined planes.

It also has two or more openings, *f*, in its periphery, by which it is allowed to pass the lugs or indentations E formed in the side of the cartridge-shell, and which holds down the anvil firmly against the butt of the cartridge-cases. By turning the anvil, (with a tool for that purpose,) after it has been placed down against the butt, the incline surface, when it comes in contact with the indentations or lugs, is forced down and held firmly upon the butt.

When this wad is used, the cartridge may be primed either in the center or at its periphery, or both. A convenient way of arranging and holding the priming is to use a percussion wad, formed of thick paper, having a perforation in the center intended to contain the fulminate, and an indentation around the periphery for the same purposes, as seen in fig. 2.

In fig. 1, *g* represents a wad of compressed or hard powder, which acts as an anvil to explode the fulminate. Said anvil is all consumed when the cartridge is fired, leaving the cartridge-shell empty, ready to be reloaded.

Fig. 3 represents a cartridge, with a metallic anvil that is not removable, but primed around its periphery and in its center, by which it is made a combined rim and center-primed cartridge.

Said disk or anvil is held in place by two or more indentations, *e*, in the side of the metallic shell A.

Fig. 10 represents a cartridge-shell that is primed in the hollow flange and at the base, and having a narrow bar or strip of metal extending across the base, and secured in its place by the indentations *e e* in the sides of the shell, making it a flange and center-primed cartridge.

The manner of operating my invention is as follows, (by means of a hand-tool for that purpose:)

The anvil or disk *b* is removed by turning it around until the openings *f* in the anvil are opposite the indentations or lugs *e e*. Then it is withdrawn, and a new percussion-way inserted. The anvil or disk is then replaced, and pressed down tightly upon the head C, by turning it in the direction of its incline surface, as represented in fig. 2. The powder and ball or shot can then be inserted, and the cartridge is ready for use.

When the anvil *g* of compressed powder is used, as represented in figs. 1, 7, 9, and 12, it is reloaded by first inserting the primed anvil *g*, then the grain powder or gun-cotton, and then the shot or ball, thus making a cheap and desirable cartridge, capable of being reloaded by hand or otherwise.

I am aware that the old French metallic cartridge, which has its entire case covered with fulminate, is flanged and center-primed, but it can only be fired at the flange, there being no anvil to explode the center-priming upon, and without which the point of the hammer would smash through the thin metallic case, and fail to explode the cartridge. This I disclaim as being a part of my invention; but What I do claim, and desire to secure by Letters Patent, is—

1. A combined rim and center or flange and center-primed cartridge, having an anvil to explode the fulminate that is in its center and around its periphery.

2. A wad or anvil primed with fulminate, said wad or anvil being consumable when the cartridge is fired, substantially as herein set forth.

3. An anvil primed with fulminating material in its center and around its periphery, substantially as and for the purpose herein set forth.

4. A removable disk or anvil, constructed so as to form a bearing for the fulminate around the periphery and in the center of the base of the cartridge-case, substantially as herein set forth.

ARTHUR MOFFATT.

Witnesses:
JOS. T. BENDER,
JAS. W. WISNER.